United States Patent [19]
Porte

[11] Patent Number: 6,079,670
[45] Date of Patent: Jun. 27, 2000

[54] HOT AIR DIFFUSER FOR A JET ENGINE AIR INLET COWL WITH DE-ICING CIRCUIT

[75] Inventor: Alain Porte, Colomiers, France

[73] Assignee: Aerospatiale Societe Nationale Industrielle, Paris, France

[21] Appl. No.: 09/203,376

[22] Filed: Dec. 2, 1998

[30]    Foreign Application Priority Data

Dec. 12, 1997 [FR] France ................................. 97-15749

[51] Int. Cl.⁷ ............................. B64D 15/00; F28D 9/02; F02G 3/00; B64B 1/24
[52] U.S. Cl. .................................. 244/134 B; 244/53 B; 60/39.093; 165/170; 165/173
[58] Field of Search ............................. 244/134 B, 53 B, 244/207, 134 R, 210, 129.4, 129.5; 165/170, 173, 171, 168, 181; 60/39.093

[56]          References Cited

U.S. PATENT DOCUMENTS

| | | | |
|---|---|---|---|
| 3,804,438 | 4/1974 | Humphries | 285/138 |
| 3,889,903 | 6/1975 | Hilby | 244/207 |
| 4,049,092 | 9/1977 | Lillard et al. | 191/40 |
| 4,490,888 | 1/1985 | Levant | 24/20 R |
| 4,738,416 | 4/1988 | Birbragher | 244/134 B |
| 5,000,399 | 3/1991 | Readnour et al. | 244/53 B |
| 5,011,098 | 4/1991 | McLaren et al. | 244/134 B |
| 5,390,878 | 2/1995 | Padden | 244/53 B |
| 5,901,784 | 5/1999 | Potier | 165/173 |
| 5,930,962 | 8/1999 | Sokolean | 52/220.1 |
| 5,947,196 | 9/1999 | Halm et al. | 165/173 |

FOREIGN PATENT DOCUMENTS

| | | |
|---|---|---|
| 0091345 | 10/1983 | European Pat. Off. . |
| 0376371 | 7/1990 | European Pat. Off. . |
| 536089 | 7/1993 | European Pat. Off. . |
| 562980 | 6/1975 | Switzerland . |
| 564747 | 10/1944 | United Kingdom ............... 244/134 R |
| 601086 | 4/1948 | United Kingdom ............... 244/134 R |

OTHER PUBLICATIONS

Engineering Notes, "Novel Nacelle Thermal Anti–Icing Exhaust Grill for Enhanced Mixing", Journal of Aircraft vol. 34, No. 6, pp. 811–813, Gillian et al, Nov. 1997.

Handley Page Bulletin, vol. X. No. 114, pp. 48 and 49, "De–Icing Equipment as fitted to a Slotted Wing", Apr. 1938.

Primary Examiner—Peter M. Poon
Assistant Examiner—Fredrick T. French, III
Attorney, Agent, or Firm—Fisher, Christen & Sabol

[57]            ABSTRACT

The present invention relates to an air inlet cowl (9) for a jet engine, especially for an aircraft. According to the invention, the diffuser (12) of hot air for de-icing, arranged in the hollow leading edge (16) of the cowl (9) is in the form of a polygonal ring and is fixed by elastic support tabs (24) each equipped with a ball joint (25) holding a straight portion (22) of the polygonal ring.

16 Claims, 6 Drawing Sheets

HOT AIR DIFFUSER FOR A JET ENGINE AIR INLET COWL WITH DE-ICING CIRCUIT

The present invention relates to the de-icing of air inlet cowls of jet engines, particularly aircraft engines.

It is known that, if need be (to prevent the formation of ice or to remove ice that has already formed), the leading edge of the air inlet cowl of such engines is de-iced by heating with pressurized hot air tapped from said engine and conveyed to said leading edge via a hot air circulation circuit.

To this end, such an air inlet cowl comprises:

a hollow leading edge delimiting an annular internal peripheral chamber which is closed by an internal partition (or frame) and equipped with at least one orifice placing said internal chamber in communication with the outside; and a pipe which can be connected, at its rear end away from said leading edge, to said hot air circulation circuit and, at its front end toward the leading edge, to injection means injecting said pressurized hot air into said internal chamber.

Thus, the pressurized hot air injected by said injection means travels through said annular internal chamber, heating it, and is discharged through said orifice.

Said injection means may be in the form of injectors with one or more injection nozzles or alternatively, as is mentioned, for example, in document EP-A-0 536 089, in the form of a diffuser consisting of circular annular pipework housed in said annular internal chamber and equipped with a number of orifices (possibly equipped with injection nozzles) distributed along said diffuser and injecting said pressurized hot air into said annular internal chamber.

In known air inlet cowls which are equipped with such a diffuser, this diffuser is fixed inside said annular chamber:

using a number of rods which, in order to be able to tolerate thermal expansions without giving rise to significant stresses in the fixing structures, have a small diameter of the order of 1 mm, which makes them fragile. Furthermore, this method of fixing requires the manufacture and assembly of a great many parts, with lengthy and tricky adjustments. Furthermore, the connections between the rods and said structures are difficult to manufacture and above all are difficult to repair. This method of fixing rods is therefore expensive;

or alternatively using a number of articulated links. However, in order to take up the inertial loadings in all directions in order to provide degrees of freedom for thermal expansions, the following are required:
various types of link, with two or three ball joints;
a great many (of the order of 20) clevis mounts welded to the diffuser;
a great many fixings, pins, screws, etc. needed for assembling articulated links.
This method of fixing using articulated links is therefore expensive to manufacture, to assemble and to adjust. Furthermore, it is highly sensitive to vibrations and fatigue failure. It therefore requires a great many service operations to replace the damaged parts. Finally, it is cumbersome;

or alternatively still, using flexible plates secured to clevis mounts welded to the diffuser. The use of such flexible plates improves the vibration behavior of the method of fixing using articulated links. However, the use of clevis mounts welded to the diffuser fixes the attachment of the flexible plates in a specific angular position which makes this method of fixing very statically redundant and therefore very difficult to manufacture and to fit. It has therefore to be mounted under stress and transmits the heat and vibrations of the diffuser into the flexible plates and surrounding structures.

The object of the present invention is to overcome these drawbacks.

To this end, according to the invention, the air inlet cowl for a jet engine, especially for an aircraft, said air inlet cowl being equipped with means for de-icing its leading edge and comprising, for this purpose:

a hollow leading edge delimiting an annular internal peripheral chamber which is closed by an internal partition and equipped with at least one orifice placing said internal chamber in communication with the outside; and a pipe which can be connected, at its rear end away from said leading edge, to a pressurized hot air circuit and, at its front end toward said leading edge, to a diffuser consisting of annular pipework housed in said annular internal chamber and equipped with a number of orifices distributed along said diffuser and injecting said pressurized hot air into said annular internal chamber, is noteworthy in that:

said diffuser consists of straight portions joined together by elbows to give said pipework a polygonal annular shape;

said diffuser is fixed inside said annular internal chamber by flat support tabs made of an elastic material, each support tab being fixed at its rear end to said internal partition and being connected at its front end to one of said straight portions of said polygonal annular pipework;

each flat support tab has a direction at least essentially orthogonal to the axis of said straight portion to which it is connected and is arranged in such a way that its plane is at least essentially parallel to said axis of said portion; and the front end of each support tab is connected to the corresponding straight portion of said polygonal annular pipework by a ball joint.

Thus, the small thickness of said tabs encourages flexibility of the assembly in the plane of the diffuser, while the width of said tabs provides the required lateral rigidity.

It will be readily understood that:

by virtue of the elastic deformation of the flexible tabs, made, for example, of a spring steel, the displacement for thermal expansion of said diffuser can be provided for, without there being any functional play. It is therefore possible to dispense with the articulation pins and associated nuts and bolts of the prior art, which are the sources of vibrations and increase the mass and cost of the air inlet cowl;

by virtue of the ball joints, the parts become easier to align and fit, while at the same time transmitting forces in an appropriate way. The parts are easier to position and can tolerate manufacturing and assembly tolerances. Furthermore, it is possible to dispense with a great many welds and it is also possible to use materials which are poor conductors of heat and/or do not transmit vibrations well. The ball joints can provide a force which permanently holds the diffuser, and this guarantees good behavior in a vibration-ridden environment;

by virtue of the fact that the diffuser is polygonal, which means that each ball joint cooperates with a straight portion of said diffuser, said ball joints may be of simple design and manufacture and make it possible to prevent the diffuser from rotating, while leaving it free to expand under the action of heat.

Advantageously, the plane of each flat support tab passes through the axis of said corresponding straight portion.

As a preference, each ball joint results from the fact that the front end of each support tab comprises a spherical cavity enclosing a spherical lining, itself enclosing the corresponding straight portion of said diffuser. Thus, said lining may be made at least in part from a material that is a poor conductor of heat and/or damps vibrations, such as a beryllium bronze, for example, which isolates the surrounding structures from said diffuser in terms of temperature and in terms of vibrations, this diffuser being a generator of heat and of vibrations.

For convenience, said spherical cavity and said spherical lining each consist of at least two cooperating complementary parts. Said spherical lining may form either a continuous cylindrical internal passage in which said corresponding straight portion of said diffuser is held, or two spaced-apart cylindrical rings in which said straight portion is held.

As preference, the air inlet cowl in accordance with the present invention has the following additional features:
    the rear end of said support tabs is fixed either directly to said internal partition, or between the latter and the leading edge;
    said spherical cavity is formed either by at least one part formed directly in the front end of said support tabs and a part attached to the latter end, or by at least two parts both attached to the front end of said support tabs;
    said tabs may have a constant longitudinal stiffness, for example because they each consist of a single elongate elastic leaf. However, especially for vibration-insulating reasons, it may be advantageous for said support tabs to have a longitudinal stiffness that is greater at their rear end than at their front end. This can be achieved by providing at least one elastically deformable strengthener at the root (rear end) of said tabs or alternatively by making each of said support tabs from the superposition of several different elastic leaves. In the latter case, it is even possible to contrive for said stiffness to increase gradually from the front end toward the rear end of said support tabs;
    to further increase the temperature and/or vibration insulation of the diffuser with respect to its surroundings, it is advantageous for said support tabs to incorporate elements which are poor conductors of heat and/or capable of damping vibrations. Such elements may be provided between the constituent parts of said support tabs, for example between the spherical cavity of the front end and the body of said support tabs or alternatively between the superposed leaves that make up said tabs, or may alternatively completely or partially cover said support tabs (elastomeric coating, such as a silicone).

It will have been readily understood from the foregoing that the number of straight portions in the ring of the diffuser is at least equal to the number of support tabs but that, of course, it may be higher, some of said straight portions not being supported by a tab such as this.

The figures of the appended drawing will make it easier to understand how the invention may be achieved. In these figures, identical references denote similar elements.

Figure 1:
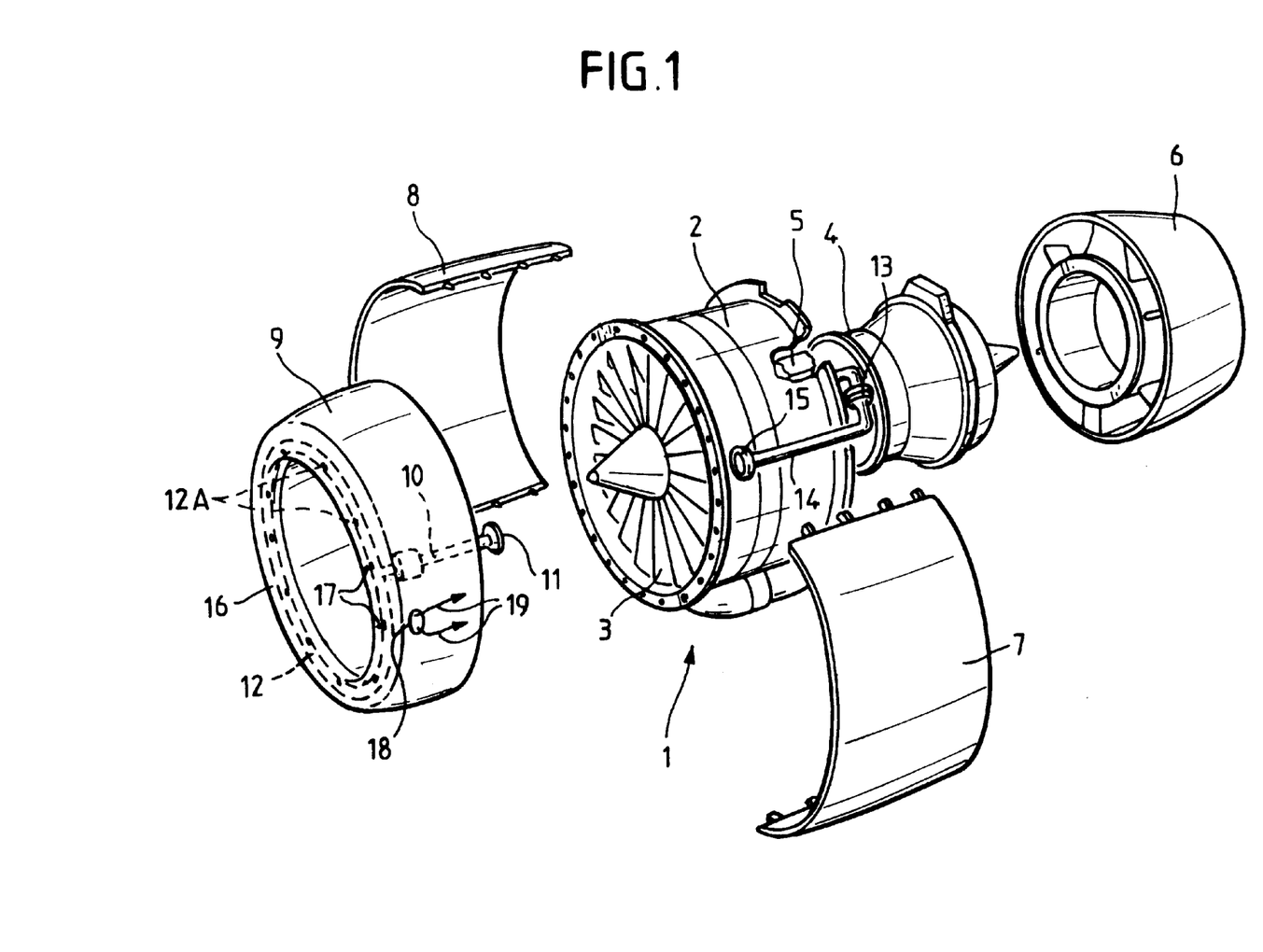
FIG. 1 shows, in exploded perspective, an aircraft jet engine and its various cowlings.

The bypass engine 1 depicted diagrammatically in FIG. 1 comprises, in a known way, a central hot air generator 2, a fan 3 and compressor stages 4, and is equipped with a hanger 5 for hanging it from a support mast (not depicted). Associated with and fixed to the engine 1 are a jetpipe assembly 6, two lateral cowls 7 and 8 and an air inlet cowl 9.

As is illustrated diagrammatically in FIG. 1, the air inlet cowl 9 comprises an internal pipe 10 provided, at its rear end that faces toward the engine 1, with a connector element 11 and, at its front end with an injector 12 which is housed in the hollow leading edge 16 of said air inlet cowl. This injector 12 is in the form of a diffuser consisting of annular pipework equipped with a number of orifices 12A distributed along the length of said diffuser (see FIG. 2) and possibly equipped with nozzles (not depicted).

Furthermore, arranged on a compressor stage of the engine 1 is a pressurized hot air tapping 13 which is connected to a pipe 14 equipped, facing the connector element 11 of the pipe 10, with a complementary connector element 15.

Thus, when the complementary connector elements 11 and 15 are connected together, pressurized hot air tapped at 13 from the engine 1 is conveyed via the pipes 14 and 10 as far as the diffuser 12. The latter can therefore blow this hot air (arrows 17) through its orifices 12A into the leading edge 16 in order to de-ice it. There is an orifice 18 for discharging to the open air (arrows 19) hot air which has flowed inside the leading edge 16.

Figure 2:
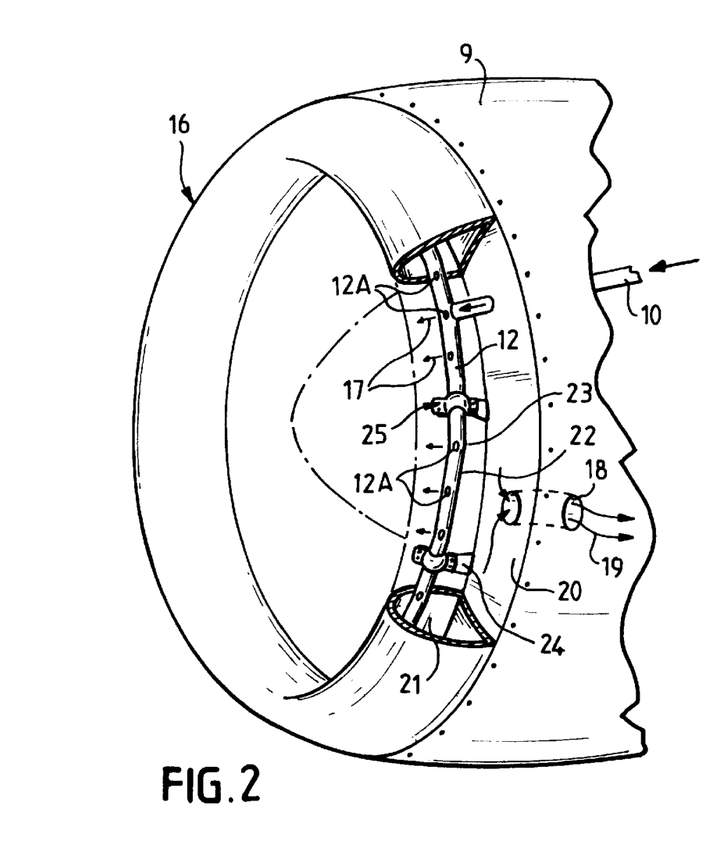
FIG. 2 is a perspective view from the front, with cutaway, of the air inlet cowl in accordance with the present invention.

As FIG. 2 shows, the hollow leading edge 16 is closed at the rear by an internal partition 20 which means that an annular internal peripheral chamber 21 is formed inside said leading edge 16. The diffuser 12 is housed in the chamber 21 and injects hot air into it over 360° and the orifice 18 places said chamber 21 in communication with the outside so that said hot air injected through the orifices 12A is discharged to the outside through the orifice 18, after having heated the leading edge 16.

Figure 3:
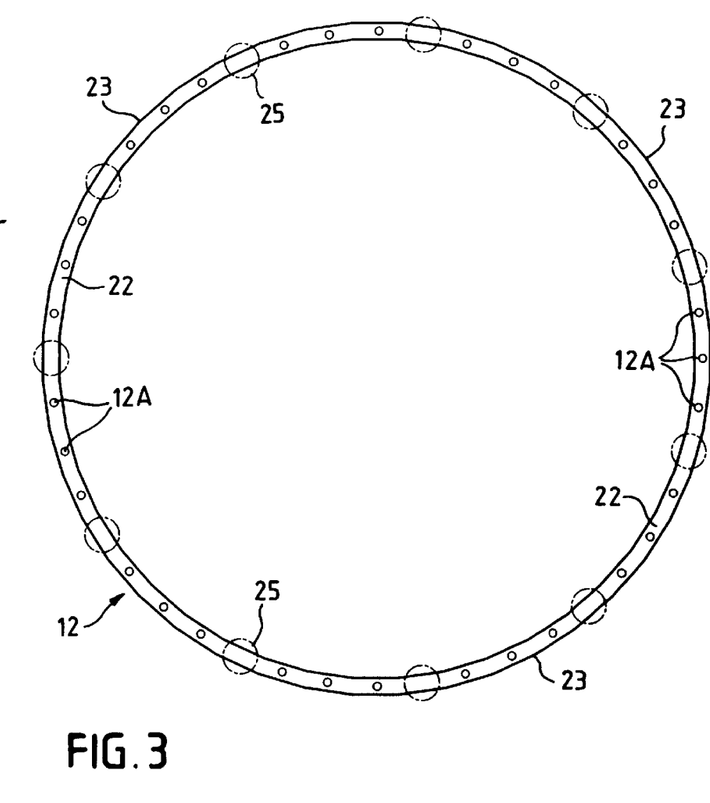
FIG. 3 is a front view of the hot air diffuser in accordance with the present invention.

The annular diffuser 12 (see also FIG. 3) is polygonal and comprises a number of successive straight portions 22, each connected to the next by an elbow 23. It is fixed inside the annular internal chamber 21 by flat support tabs 24, for example made of spring steel, distributed along the length of the annular diffuser 12, each tab 24 being fixed at its rear end 24A to the internal partition 20 and being connected at its front end 24B to one of said straight portions 22 of said diffuser by a ball joint 25. Each flat support tab 24 has a longitudinal direction L—L at least essentially orthogonal to the axis X—X of the straight portion 22 of the diffuser 12 to which it is connected (see FIG. 4) and is arranged in such a way that its plane passes through the axis X—X of said portion (see FIGS. 5, 6 and 9 to 14).

To form the ball joint 25, the front end of each support tab 24 bears a spherical cavity (see FIG. 5) enclosing a spherical lining 26 or 27, for example made of beryllium bronze, through which the corresponding straight portion 22 of said diffuser 12 passes.

Figures 4, 7, 8:
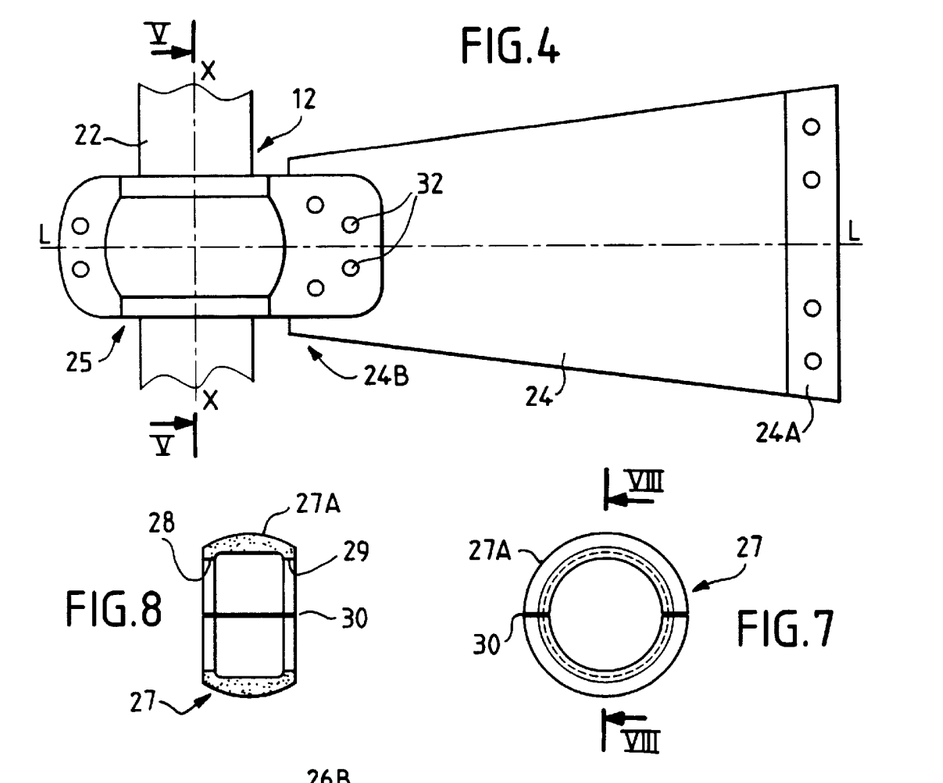
FIG. 4 is a view from above of a tab for supporting said diffuser.
FIG. 7 shows the ball joint of FIG. 6, in elevation.
FIG. 8 is a section through said ball joint on the line VIII—VIII of FIG. 7.
Figure 5:
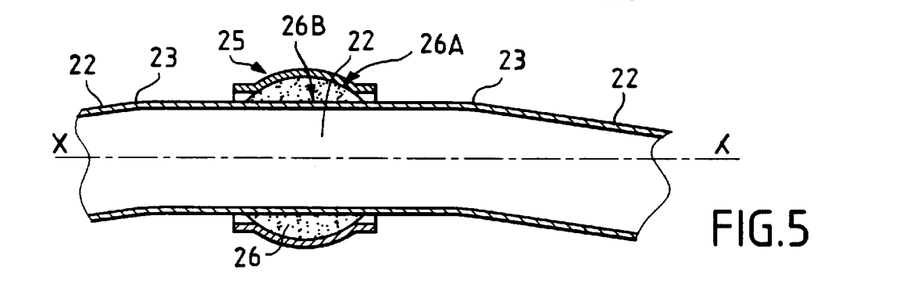
FIG. 5 is a part section of said diffuser passing through the axis of its straight portions, on line V—V of FIG. 4.

In the embodiment depicted in FIG. 5, the spherical lining 26 comprises a spherical external surface 26A held by the spherical cavity of the front end 24B of the support tab 24 and a cylindrical internal passage 26B in which said straight portion 22 of the diffuser is held. A spherical lining 26 is made of two half shells (in a similar way to what is shown in FIGS. 7 and 8 in the case of the lining 27) so that it can easily be fitted on said straight portion 22.

Figure 6:
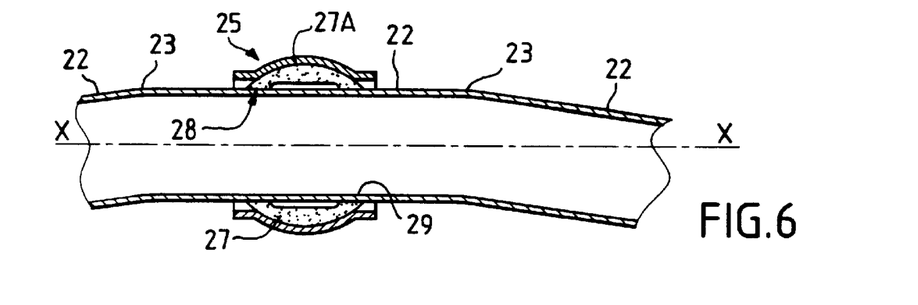
FIG. 6 illustrates an alternative form of ball joint, in a view similar to FIG. 5.

In the embodiment of FIGS. 6, 7 and 8, the spherical lining 27, also made of beryllium bronze, comprises a spherical external surface 27A held by the spherical cavity of the front end 24B of the support tab 24 and forms two spaced-apart cylindrical internal rings 28 and 29 in which said straight portion 22 of the diffuser 12 is held. The lining 27 is made of two half shells that can be assembled along a parting line 30.

Figure 9:
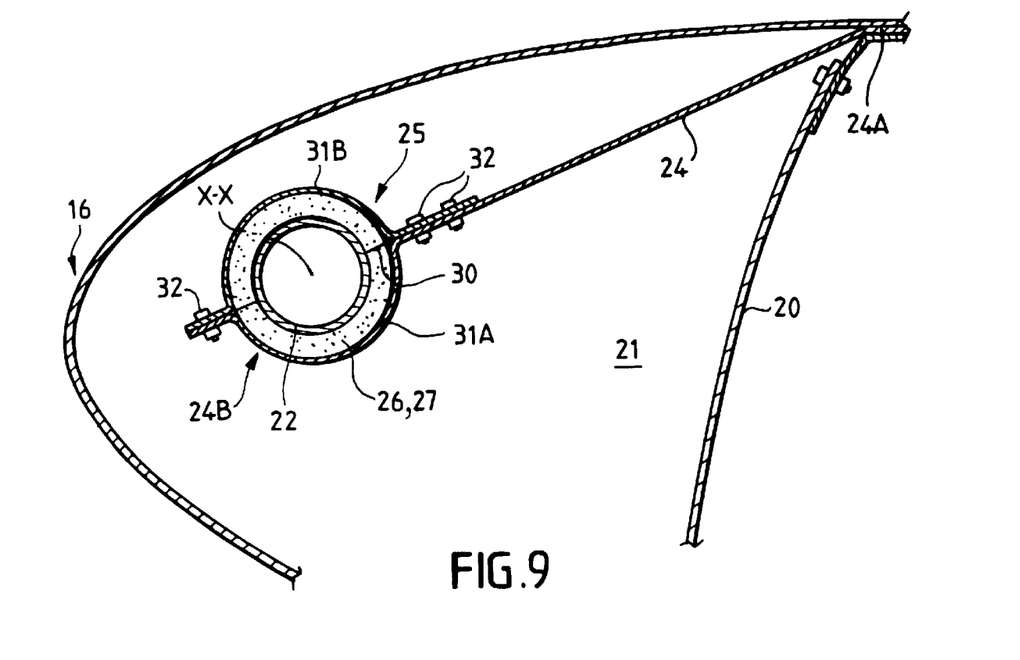
FIGS. 9 to 14 illustrate, in longitudinal section along the length of a support tab, various alternative ways of fixing said diffuser.
Figure 10:
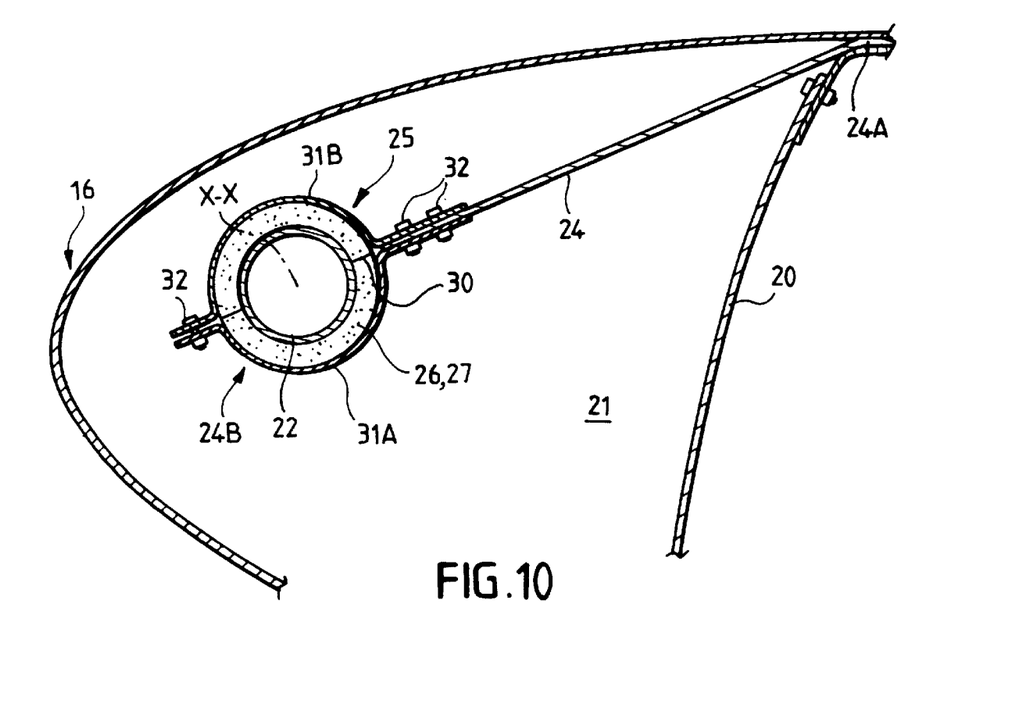
Figure 11:
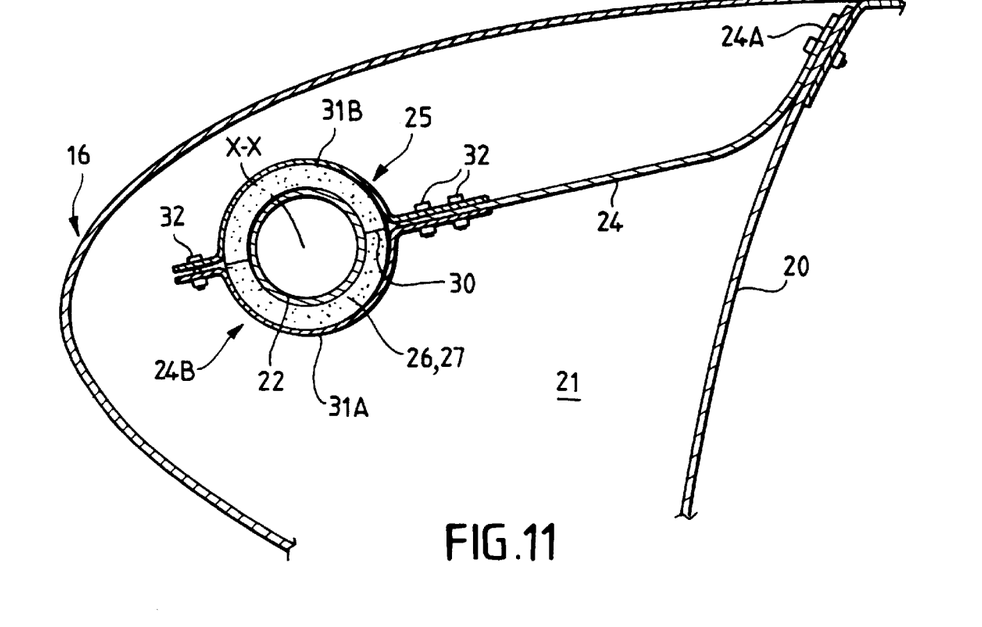
Figure 12:
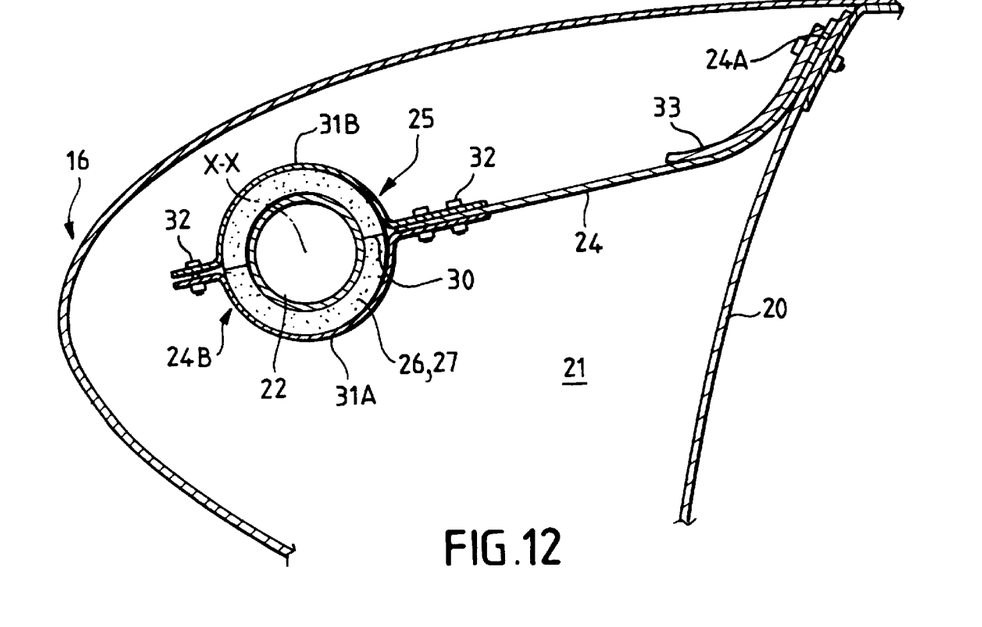

As can be seen in FIG. 9, the rear end 24A of the tabs 24 may be fixed between the skin of the leading edge 16 and the partition 20. Furthermore, in this figure, the spherical cavity of the front end 24B of the fixing tabs 24 is formed by two spherical half shells 31A and 31B, one of which, 31A, is formed directly in said front end 24B of the tabs 24 and the other of which is attached and fixed to the latter by fixing means 32. In the alternative form of FIG. 10, the half shell 31A is also attached and fixed to the fixing tab 24, just like the half shell 31B. FIG. 11 shows yet another alternative form, similar to the one in FIG. 10, except as far as the fixing of the rear end 24A of the support tabs 24 is concerned: in this instance, these are no longer fixed between the skin of the leading edge 16 and the internal partition 20 but are fixed directly to the latter. As FIG. 12 shows, a strengthening elastic leaf 33, fixed to the partition 20 and resting against the rear end 24A of the support tab 24 may be provided, in order to increase the stiffness of the latter.

Figure 13:
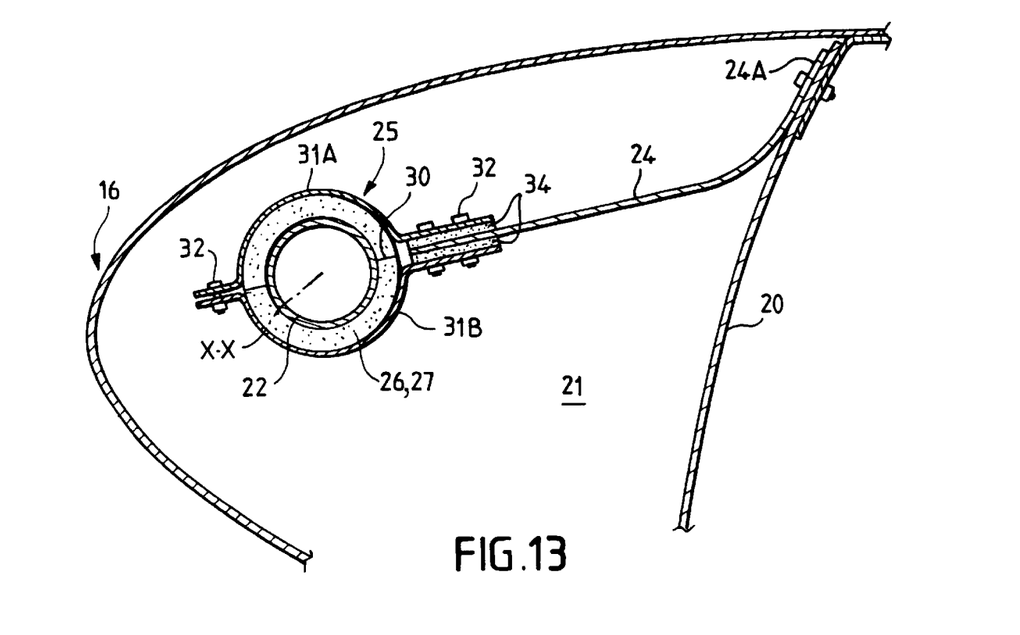
Figure 14:
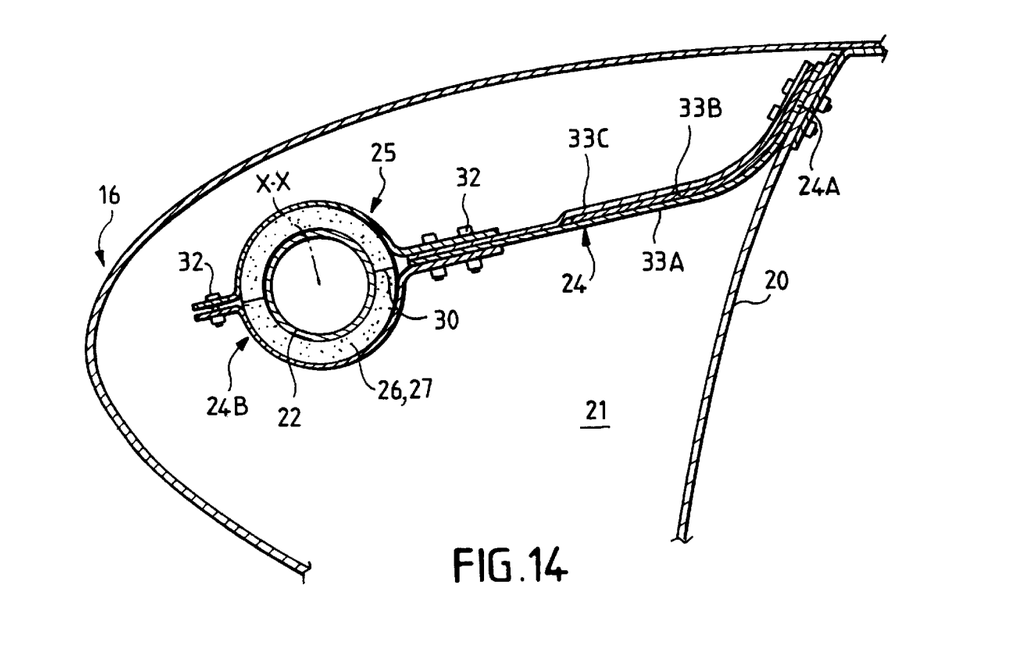

In the embodiment of FIG. 13, holding elements 34 made of a thermally insulating and/or vibration-damping material are provided between said half shells 31A and 31B and the support leaf 24. In this way, the propagation to the surrounding structure of vibrations and/or heat generated by the diffuser 12 is avoided. FIG. 14 depicts an embodiment in which the tabs 24 are made up of several superposed and different-length flexible leaves 33A, 33B, 33C, so that said tabs 24 have a stiffness that increases gradually from their front end 24B toward their rear end 24A. Such an embodiment has the additional advantage that layers (not depicted) of anti-vibration material can be interposed between said flexible leaves 33A, 33B, 33C and therefore damp out the vibrations generated by the diffuser 12.

Incidentally, irrespective of the embodiment of the support tabs 24, it may be advantageous for them to be covered, completely or partially, with an envelope of anti-vibration material (for example an elastomer of the silicone type) to prevent them from resonating and transferring vibrations. The thickness and form of such an anti-vibration coating (not depicted) may vary.

What is claimed is:

1. An air inlet cowl (9) for a jet engine (1), especially for an aircraft, said air inlet cowl (9) being equipped with means for de-icing its leading edge (16) and comprising, for this purpose:

a hollow leading edge (16) delimiting an annular internal peripheral chamber (21) which is closed by an internal partition (20) and equipped with at least one orifice (18) placing said internal chamber (21) in communication with the outside; and a pipe (10) which can be connected, at its rear end away from said leading edge (16), to a pressurized hot air circuit (14) and, at its front end toward said leading edge (16), to a diffuser (12) consisting of annular pipework housed in said annular internal chamber (21) and equipped with a number of orifices (12A) distributed along said diffuser and injecting said pressurized hot air into said annular internal chamber (21), wherein:

said diffuser (12) consists of straight portions (22) joined together by elbows (23) to give said pipework a polygonal annular shape;

said diffuser (12) is fixed inside said annular internal chamber (21) by flat support tabs (24) made of an elastic material, each support tab (24) being fixed at its rear end (24A) to said internal partition (20) and being connected at its front end (24B) to one of said straight portions (22) of said polygonal annular pipework;

each flat support tab (24) has a direction at least essentially orthogonal to the axis (X—X) of said straight portion (22) to which it is connected and is arranged in such a way that its plane is at least essentially parallel to said axis (X—X) of said portion (22); and the front end (24B) of each support tab (24) is connected to the corresponding straight portion (22) of said polygonal annular pipework by a ball joint (25).

2. The air inlet cowl as claimed in claim 1, wherein the front end (24B) of each support tab (24) comprises a spherical cavity enclosing a spherical lining (26, 27) through which the corresponding straight portion (22) of said diffuser (12) passes.

3. The air inlet cowl as claimed in claim 2, wherein said spherical cavity and said spherical lining each consist of at least two cooperating complementary parts.

4. The air inlet cowl as claimed in claim 3, wherein said spherical cavity is formed by at least one part (31A) formed directly in the front end (24B) of said support tabs (24) and a part (31B) attached thereto.

5. The air inlet cowl as claimed in claim 3, wherein said spherical cavity is formed by at least two parts (31A and 31B) attached to the front end (24B) of said support tabs (24).

6. The air inlet cowl as claimed in claim 2, wherein said spherical lining (26) forms a cylindrical internal passage (26B) in which said corresponding straight portion (22) of said diffuser (12) is held.

7. The air inlet cowl as claimed in claim 2, wherein said spherical lining (26) forms two spaced-apart cylindrical internal rings (28, 29) in which said corresponding straight portion (22) of said diffuser (12) is held.

8. The air inlet cowl as claimed in claim 2, wherein said spherical lining (26, 27) is made at least in part from a thermally insulating material.

9. The air inlet cowl as claimed in claim 2, wherein said spherical lining (26, 27) is made at least in part from a vibration-insulating material.

10. The air inlet cowl as claimed in claim 1, wherein the plane of each flat support tab (24) passes through the axis (X—X) of said corresponding straight portion (22).

11. The air inlet cowl as claimed in claim 1, wherein the rear end (24A) of said support tabs (24) is fixed directly to said internal partition (20).

12. The air inlet cowl as claimed in claim 1, wherein the rear end (24A) of said support tabs (24) is fixed between said leading edge (16) and said internal partition (20).

13. The air inlet cowl as claimed in claim 1, wherein said support tabs (24) have a constant longitudinal stiffness.

14. The air inlet cowl as claimed in claim 1, wherein said support tabs (24) have a longitudinal stiffness which is greater at their rear end (24A) than at their front end (24B).

15. The air inlet cowl as claimed in claim 1, wherein said support tabs (24) incorporate elements (34) which are poor conductors of heat.

16. The air inlet cowl as claimed in claim 1, wherein said support tabs (24) incorporate elements (34) which are capable of damping vibrations.

* * * * *